No. 897,861. PATENTED SEPT. 1, 1908.
H. McC. NORRIS.
VARIABLE SPEED DRIVING MECHANISM.
APPLICATION FILED APR. 13, 1908.
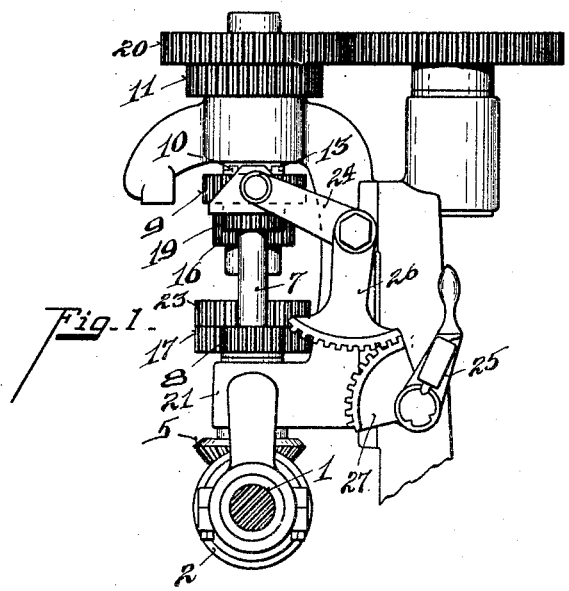
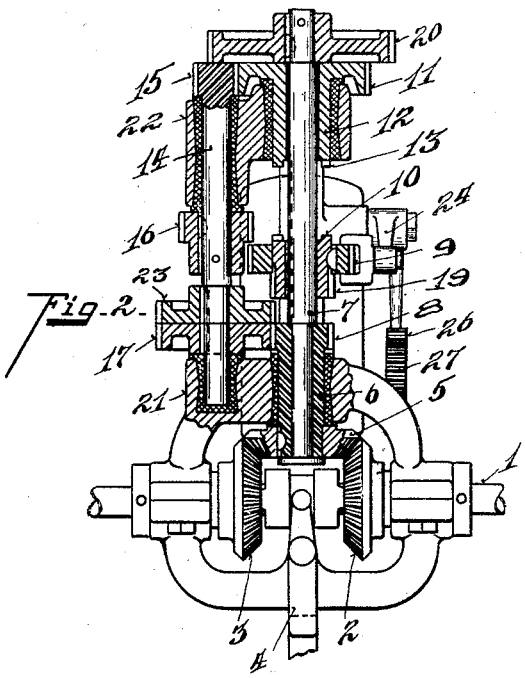

UNITED STATES PATENT OFFICE.

HENRY McCOY NORRIS, OF CINCINNATI, OHIO.

VARIABLE-SPEED DRIVING MECHANISM.

No. 897,861.  
Specification of Letters Patent.  
Patented Sept. 1, 1908.

Application filed April 13, 1908. Serial No. 426,807.

*To all whom it may concern:*

Be it known that I, HENRY McCOY NORRIS, a citizen of the United States, residing at Cincinnati, in the county of Hamilton and State of Ohio, have invented certain new and useful Improvements in Variable-Speed Driving Mechanism, of which the following is a specification.

My invention relates to a variable speed drive.

The object of the invention is to provide a variable speed drive in which one of the drives shall preferably be direct gear and other compound gear drives.

The features of my invention are more fully set forth in the description of the accompanying drawings, forming a part of this specification, in which:—

Figure 1 is a side elevation of the device.
Fig. 2 is a central vertical section.

1 is the main driving shaft, having right and left hand bevel gears 2, 3, thereon, meshing with the bevel gear wheel 5 which is mounted on a sleeve 6 loose on shaft 7, shaft 7 being the shaft to be driven, 4 is a yoke lever for alternately clutching gears 2, 3, to shaft 1.

8 is a pinion formed on the inner end of sleeve 6.

9 and 19 represent different diameter gear wheels constituting the compound gear member splined to shaft 7 so as to slide thereon and turn therewith.

10 is a clutch member formed on the end face of gear 9.

11 is a gear wheel on sleeve 12 loosely mounted on shaft 7, and 13 is a clutch member on the end of sleeve 12, adapted to cooperate with clutch member 10.

20 is a wheel member on the outer end of shaft 7.

14 is a shaft counter to shaft 7.

21, 22, represent bearings for supporting said shafts.

17 is a gear wheel fixed on shaft 14 and meshing with pinion 8.

23 is a gear wheel also fixed on shaft 14 adapted to be meshed with compound gear member 19 when this member is slipped down from the position shown in Fig. 2.

16 represents a gear wheel fixed to the shaft 14, adapted to be meshed with compound gear member 9 when said member is slipped upward from the position shown in Fig. 2.

15 represents a pinion fixed on shaft 14 and meshing with gear 11 on shaft 7.

24, 25, represent levers connected by segmental gears 26, 27, for shifting the compound gear members 9, 19.

In the position shown in Fig. 2 the drives are all out. When compound gear member 19 is meshed with the gear 23, the gears 23, 17, being of the same diameter, as are also gears 8 and 19, the shaft 7 will be rotated at the same rate of speed as the gear 5. This being what I have termed a direct gear drive. When compound gear member 9 is meshed with gear wheel 16 motion will be transmitted through gears 8, 17, shaft 14, gear 16, and gear 9, driving shaft 7. This being an indirect or back gear drive. When the compound gears 9, 19, are shifted still further upward and clutch teeth 10 are engaged with clutch teeth 13, gear 11 will be fixed to shaft 7 and the drive will be through gears 8, 17, shaft 14, pinion 15, and gear 11, driving shaft 7 at another back gear speed. Of course, the speed ratios may be arranged to suit the requirements. The gears 23, 17, may be formed as a single double faced gear, if desired. If gear 23 were made of a different diameter than gear 17 and gear 19 were made of a corresponding diameter, shaft 7 would not be driven at the same rate of speed as the gear 5. This is quite within the range of my invention although I prefer to furnish one direct gear drive as shown and described.

Having described my invention, I claim:—

1. In a variable speed device, a first and second shaft, a driving gear loose on one end of the first shaft, a compound gear adapted to turn with and slide on the intermediate portion of the first shaft, and having a clutch member formed thereon, and a third gear loose on the other end of the first shaft and having a coöperating clutch member for said first named clutch member, a double gear fixed to the second shaft meshing with the driving gear on the first shaft and adapted to be intermeshed with one of the members of the compound gear of the first shaft, a middle gear fixed to the second shaft and adapted to be intermeshed with the other member of the compound gear on the first shaft, a third gear fixed on the end of the second shaft and intermeshed with the end gear on the first shaft, and means for shifting the said compound intermediate with its clutch, substantially as described.

2. In a variable speed device, a first shaft, end gears loose thereon, and a compound intermediate gear splined thereon, clutch members for connecting one of the loose gears to the intermediate, a second shaft having four gears fixed thereon, two of which are adapted to be engaged by the respective members of the compound intermediate gear of the first shaft, substantially as described.

In testimony whereof, I have hereunto set my hand.

HENRY McCOY NORRIS.

Witnesses:
 LEO J. O'DONNELL,
 LUISE BECK.